(12) United States Patent
Sohmshetty et al.

(10) Patent No.: US 10,486,215 B2
(45) Date of Patent: Nov. 26, 2019

(54) APPARATUS AND METHOD FOR PIERCING AND TRIMMING HOT STAMPED PARTS

(71) Applicant: Ford Motor Company, Dearborn, MI (US)

(72) Inventors: Raj Sohmshetty, Canton, MI (US); Rohit Telukunta, Madison Heights, MI (US); Darryl Leigh Young, Canton, MI (US); Varinder Singh Saini, Toronto (CA); Torsten Hallfeldt, Eschweiler (DE)

(73) Assignee: Ford Motor Company, Dearborn, MI (US)

( * ) Notice: Subject to any disclaimer, the term of this patent is extended or adjusted under 35 U.S.C. 154(b) by 258 days.

(21) Appl. No.: 15/625,486

(22) Filed: Jun. 16, 2017

(65) Prior Publication Data

US 2018/0361455 A1 Dec. 20, 2018

(51) Int. Cl.

| | |
|---|---|
| *C21D 1/06* | (2006.01) |
| *B21D 22/02* | (2006.01) |
| *B21D 28/26* | (2006.01) |
| *B21D 53/88* | (2006.01) |
| *B60R 19/02* | (2006.01) |
| *B60R 19/03* | (2006.01) |
| *B21D 22/20* | (2006.01) |
| *B21D 24/16* | (2006.01) |
| *B21D 37/16* | (2006.01) |

(52) U.S. Cl.
CPC ........... *B21D 22/022* (2013.01); *B21D 22/02* (2013.01); *B21D 22/208* (2013.01); *B21D 24/16* (2013.01); *B21D 28/26* (2013.01); *B21D 37/16* (2013.01); *B21D 53/88* (2013.01); *B60R 19/02* (2013.01); *B60R 19/03* (2013.01)

(58) Field of Classification Search
CPC .... B21D 22/022; B21D 22/208; B21D 24/16; B21D 28/26; B21D 37/16; B21D 53/88; B21D 22/02; B60R 19/02; B60R 19/03
USPC .......................................................... 72/333
See application file for complete search history.

(56) References Cited

U.S. PATENT DOCUMENTS 3,972,744 A * 8/1976 Cantrell .................. B60R 19/03
148/572
4,010,969 A * 3/1977 Cantrell .................. B60R 19/02
148/643

(Continued)

FOREIGN PATENT DOCUMENTS

JP 2003328031 A 11/2003
WO 2009123538 A1 10/2009

*Primary Examiner* — David B Jones
(74) *Attorney, Agent, or Firm* — Raymond Coppiellie; Brooks Kushman P.C.

(57) ABSTRACT

A die apparatus including a first die element and a second die element is provided. The first die element is arranged with the second die element for disposal of a blank therebetween and includes a coolant channel and a trim groove for alignment with a trim line of the blank. A groove insert is disposed within the trim groove arranged to support a portion of the blank extending thereover and to reduce a cooling rate of the blank. The groove insert may be of a material including reflective radiation characteristics to reduce heat transfer from portions of the blank adjacent the trim line. The first die element may include a cavity aligned with a pierce region of the blank so that the pierce region does not contact an adjacent die element surface.

18 Claims, 4 Drawing Sheets

(56) References Cited

U.S. PATENT DOCUMENTS

| | | | | |
|---|---|---|---|---|
| 5,916,389 A * | 6/1999 | Lundstrom | ............ | B21D 37/16 |
| | | | | 148/640 |
| 7,278,287 B2 * | 10/2007 | Bohner | .................. | B21D 37/16 |
| | | | | 72/342.94 |
| 7,678,208 B2 | 3/2010 | Bodin | | |
| 8,646,302 B2 * | 2/2014 | Lety | .................... | B21D 22/022 |
| | | | | 72/342.7 |
| 8,919,169 B2 * | 12/2014 | Smith | .................... | B21D 22/02 |
| | | | | 72/331 |
| 9,718,265 B2 * | 8/2017 | Chergui | ................ | B21D 22/022 |
| 9,770,750 B2 * | 9/2017 | Banik | .................. | B21D 22/208 |
| 2012/0060982 A1 | 3/2012 | Bohner et al. | | |
| 2013/0136945 A1 | 5/2013 | Charest et al. | | |

\* cited by examiner

APPARATUS AND METHOD FOR PIERCING AND TRIMMING HOT STAMPED PARTS

TECHNICAL FIELD

This disclosure relates to an apparatus and method for piercing and trimming blanks to form vehicle components.

BACKGROUND

Modern vehicle body structures are increasingly utilizing hot stamping to form complex part geometries and to achieve ultra-high strength steel (DHSS) properties. Utilizing DHSS presents challenges for trimming and piercing operations relating to severe wear and sometimes unexpected failure in trimming and piercing tools. Trimming is an operation in which unwanted portions of a blank or vehicle component are cut off to achieve a final vehicle component shape. Piercing is a shearing operation used to create openings or holes in a blank or vehicle component.

Traditional die trimming operations for DHSS vehicle components may create micro-cracks and other quality problems in trimmed edges or pierced openings of the vehicle component. Issues with traditional die trimming operations led to a use of laser trimming. Prior art manufacturing processes use laser trimming after stamping and die quenching operations. The use of a laser trim apparatus requires higher capital investment and a larger space in comparison to traditional die trimming and piercing stations. For example, a laser trimming process may amount to 20% to 50% of a total cost to manufacture a hot stamped vehicle component.

This disclosure is related to solving the above problems and other problems summarized below.

SUMMARY

A die apparatus includes a first die element and a second die element. The first die element is arranged with the second die element for disposal of a blank therebetween and includes a coolant channel and a trim groove for alignment with a trim line of the blank. A groove insert is disposed within the trim groove arranged to support a portion of the blank extending thereover and to reduce a cooling rate of the blank. The groove insert may be of a material including reflective radiation characteristics to reduce heat transfer from portions of the blank adjacent the trim line. The first die element may include a cavity aligned with a pierce region of the blank so that the pierce region does not contact an adjacent die element surface. A first portion of the coolant channel may be spaced approximately six millimeters from a die element surface and a second portion of the coolant channel may be spaced more than six millimeters from the die element surface. The coolant channel may be shaped to conform to the trim groove and a surface of one of the first die element and the second die element. The coolant channel may be gun drilled and form a V shape. An apex of the V shape may be spaced more than six millimeters from a respective die surface. The trim groove may have a depth between approximately 0.5 millimeters and 4.0 millimeters relative to a surface of the first die element. The groove insert may comprise two components sized to partially fill a volume of the trim groove and spaced from one another such that a gap therebetween is aligned with the trim line. The groove insert may be a single component sized to substantially fill a volume of the trim groove. The blank may be arranged with the first die element and the second die element so that another trim line is located outside of the die elements to avoid die cooling to reduce a cooling rate of the blank to prevent martensitic transformation.

A method of forming vehicle components includes heating a blank to induce blank austenitization; positioning the blank between two die elements so a trim line portion of the blank aligns with a trim groove of one of the two die elements; forming a vehicle component from the blank; and cooling the blank via heat transfer to the two die elements. The trim line is arranged with the trim groove to minimize heat transfer between the two die elements and portions of the vehicle component adjacent the trim line to form soft strength zones. Portions of the vehicle component other than the trim line are arranged between the two die elements for cooling at a rate sufficient for martensitic transformation. The method may further include identifying a pierce region of the vehicle component; and aligning a cavity of one of the two die elements with a pierce region of the vehicle component to minimize heat transfer between the two die elements and the pierce region to form another soft strength zone at the pierce region. The method may further include applying a coating upon a surface of the cavity or trim groove. The coating may have high radiation reflectivity characteristics to further reduce heat transfer between the two die elements and the pierce region. The method may further include positioning a groove insert in the trim groove to support a portion of the blank extending thereover.

A die apparatus includes first and second die elements spaced from one another to receive a blank therebetween. At least one of the first and second die elements includes a trim groove for aligning with a trim line of the blank, a coolant channel spaced from the trim groove, and a die element surface. The trim groove has a depth equal to two times a thickness of the blank and a width equal to ten to fifteen times the thickness of the blank so that the first and second die element cool regions of the blank adjacent the trim line at a rate slower than a critical cooling rate to prevent martensitic transformation. At least one of the first and second die elements may further define a cavity for alignment with a pierce region of the blank so that the pierce region does not contact an adjacent surface of the first and second die elements. The trim groove may have a depth between approximately 0.5 millimeters and 4.0 millimeters relative to a surface of one of the first and second die elements and a width between approximately ten millimeters and thirty millimeters. The apparatus may further include one of a groove insert for disposal within the trim groove or a coating applied to or formed upon a surface of the trim groove. The groove insert and the coating may each be of a material having reflector characteristics to reduce thermal heat transfer between portions of the blank adjacent the trim line and one of the first and second die elements. The groove insert may be sized to substantially fill a volume of the trim groove. The groove insert may include first and second components spaced from one another so that a gap between the first and second components is aligned with the trim line of the blank.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
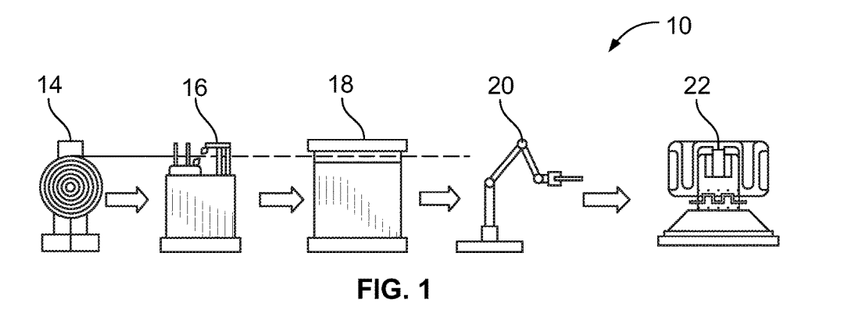
FIG. 1 is a diagrammatic view illustrating an example of a vehicle component stamping process.

FIG. 1 is a diagrammatic view of an example of a stamping process, referred to as a stamping process 10 herein. The stamping process 10 may operate with a die apparatus having a trim groove and a coolant channel configuration to form soft strength zones of a vehicle component along a vehicle component trim line to manufacture high quality vehicle components without issues related to traditional die trimming operations. The die apparatus of the stamping process 10 further removes a need for a laser trimming apparatus to reduce costs and eliminates a separate trimming station by including trimming and piercing operations with a vehicle component forming station.

For example, a coil apparatus 14 includes material for a blank wound about a central axis. The material may be cut in cutter 16 to create a blank. The blank may be positioned within a furnace 18 for thermal treatment to austenitize the blank. A first transfer apparatus 20 may transfer the now austenitized blank to a die apparatus 22. In prior art processes as described above, the blank is then stamped into a vehicle component and quenched within a die apparatus. The vehicle component is then transferred to a trimming and piercing apparatus to cut off unwanted portions of the vehicle component and to pierce holes. In contrast, the die apparatus 22 forms, trims, and pierces the blank to form a vehicle component.

Figure 2:
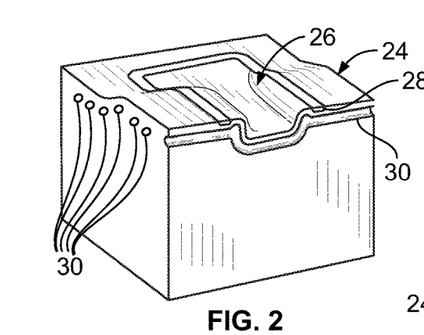
FIG. 2 is a perspective view of an example of a portion of a die element of a die apparatus of the stamping process of FIG. 1.

FIG. 2 is a perspective view, in cross-section, of a portion of the die apparatus 22. A first die element 24 includes a form cavity 26, a first trim groove 28, and a coolant channel 30. The form cavity 26 is sized and shaped to form a vehicle component from a blank with a second die element and according to a design requirement. For example, the second die element may include a separate form cavity for alignment with the form cavity 26 to form a vehicle component as further described herein. The first trim groove 28 is aligned with a trim line of the vehicle component to assist in forming a soft strength zone on either side of the trim line. In one example, the soft strength zone is targeted to have a tensile strength of no more than 1000 MPa at a trim region or a pierce region and a target of less than 1300 MPa at other portions of the vehicle component.

The coolant channel 30 is variably spaced from the vehicle component to assist in forming the varied strength zones along the vehicle component. For example, the coolant channel 30 may be spaced closer to a die surface to increase heat extraction from the vehicle component and may be spaced further away from the die surface to reduce heat extraction from the vehicle component. The increased heat extraction forms harder strength zones and the reduced heat extraction forms softer strength zones.

Figure 3:
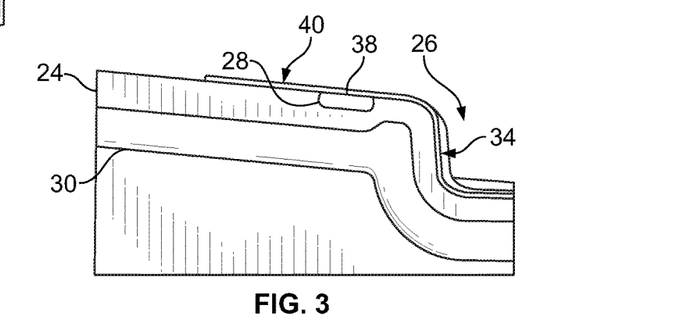
FIG. 3 is a detailed view of a portion the die element of FIG. 2.

FIG. 3 is detailed view, in cross-section, of a portion of the first die element 24. A vehicle component 34 is shown formed upon the first die element 24. A trim line 38 separates the vehicle component 34 from a scrap portion 40 of the vehicle component 34. The scrap portion 40 is trimmed from the vehicle component 34 to create a final product of the vehicle component 34. The first trim groove 28 is shown aligned with the trim line 38 to provide a gap between a portion of the vehicle component 34 and a surface of the first die element 24. This gap reduces heat transfer, e.g. reduces a cooling rate, between a portion of the vehicle component 34, such as the portions on either side of the trim line 38, and the surface of the first die element 24 located adjacent the coolant channel 30.

Figure 4:
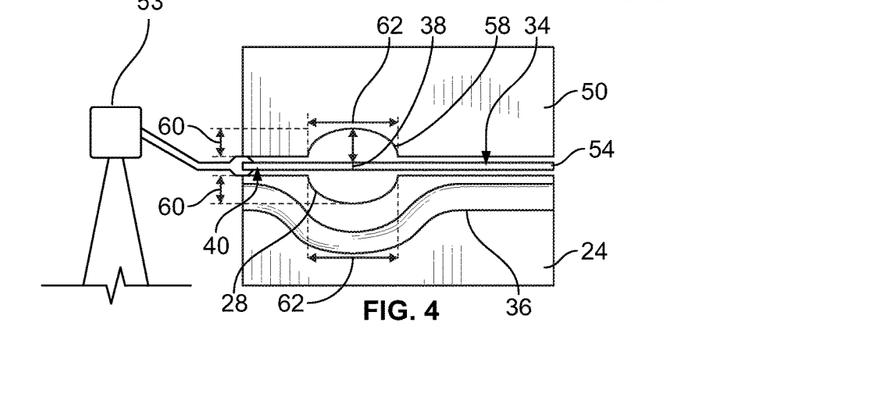
FIG. 4 is a schematic diagram, in cross-section, of an example of a portion of a die apparatus of the stamping process of FIG. 1.

FIG. 4 is a schematic diagram illustrating a portion of the die apparatus 22. The die apparatus 22 includes the first die element 24 and a second die element 50. The first die element 24 and the second die element 50 are arranged with one another for disposal of a blank 54 therebetween. A fixture 55 may hold the blank 54 between the first die element 24 and the second die element 50. The second die element 50 includes a second trim groove 58. The first die element 24 and the second die element 50 are arranged with one another so that the trim line 38 is aligned between the first trim groove 28 and the second trim groove 58.

A geometry of the trim grooves influences the cooling rates along the trim line 38 to prevent martensitic transformation and to form soft strength zones. For example, each of the trim grooves may have a depth 60 substantially equal to 0.5 millimeters to 4.0 millimeters. The depth 60 may be one to two times a thickness of the blank 54. Each of the trim grooves may have a width 62 substantially equal to ten to thirty millimeters. The width 62 may be equal to ten to fifteen times the thickness of the blank 54. In one example, the blank 54 may have a thickness of 1.5 to 2 millimeters. In this example, the depth 60 of each of the trim grooves may have a length equal to approximately 3 to 4 millimeters and the width 62 of each of the trim grooves may have a length equal to approximately 15 to 30 millimeters. The depth 60 and the width 62 of the first trim groove 28 may be optimized to vary with a thickness of the blank 54 and to vary with desired microstructures of the blank 54 adjacent the first trim groove 28 and the second trim groove 58.

Figures 5A, 5B:
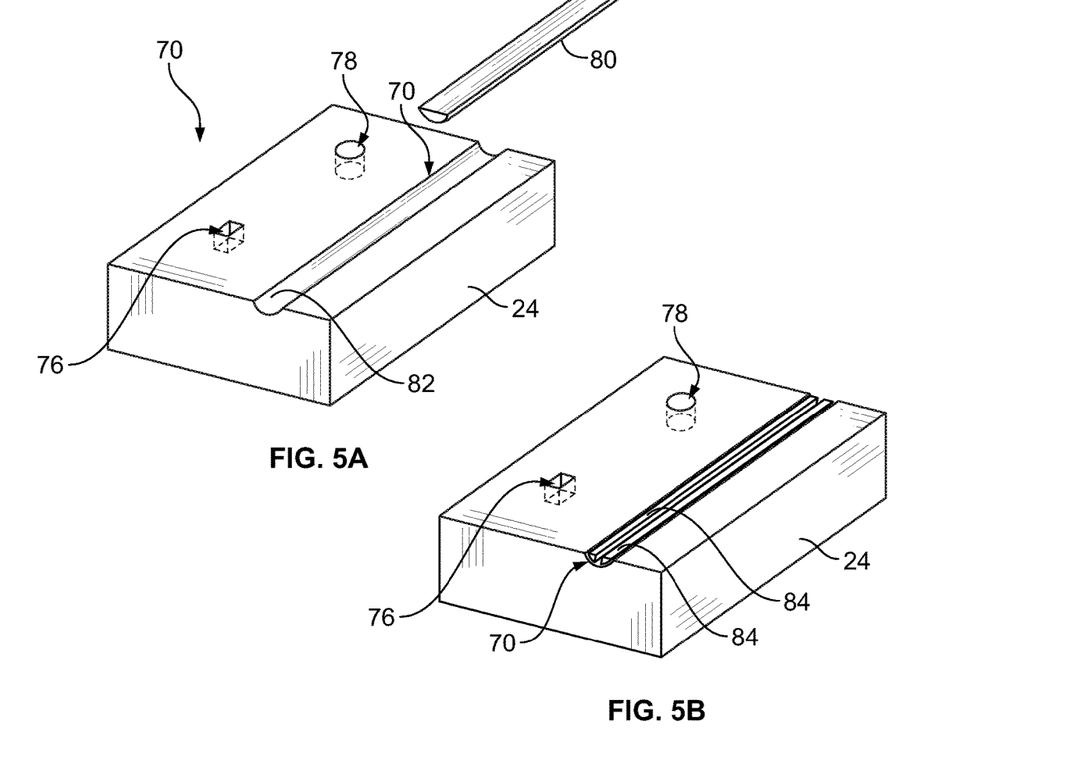
FIG. 5A is a perspective view of an example of a portion of a die element of the die apparatus of the stamping process of FIG. 1 showing an example of a trim groove insert.
FIG. 5B is a perspective view of the portion of the die element of FIG. 5A showing another example of a trim groove insert.

FIG. 5A is a perspective view showing another example of a trim groove and trim groove insert for the first die element 24 of the die apparatus 22. In this example, the first die element 24 includes a trim groove 70, a first cavity 76, and a second cavity 78 each for alignment with a portion of a blank or vehicle component for trimming or piercing. It is also contemplated that the first die element 24 may only include the trim groove 70 or only include one of the first cavity 76 and the second cavity 78. The trim groove 70 may be arranged upon the first die element 24 to extend along trim lines of a blank or vehicle component as described above.

Optionally, a groove insert 80 or a coating may assist with forming desired microstructures of portions of the blank or vehicle component for trimming or piercing operations. The groove insert 80 may assist in supporting a portion of the blank or vehicle component extending over the trim groove 70. Each of the groove inserts 84 may be of a material to operate as a reflector to minimize heat extraction from adjacent coolant channels to further assist in forming desired microstructures in soft strength zones. In one example, each of the groove inserts 84 may be of a ceramic material having reflective radiation characteristics. The groove insert 80 may be sized and shaped to substantially fill a trim groove or may be shaped as strips for contacting a lower portion of the trim groove 70 and a portion of the blank or vehicle component extending over the trim groove 70.

The coating may be of a material to operate as a reflector to minimize heat extraction from adjacent coolant channels (not shown in FIG. 5A). The coating may be applied to or formed upon a surface 82 of the trim groove 70. The coating may be a low thermal heat reflective material or a radiation reflective paint to reflect heat back to the blank or vehicle component to maintain a cooling rate above a sub-critical cooling rate. The coating may be a powder coated material, electroplated, or a type of foil. It is contemplated that the first cavity 76 and the second cavity 78 may also include an insert or coating to assist in minimizing heat transfer from the portions of the blank or vehicle component located adjacent the first cavity 76 and the second cavity 78.

FIG. 5B illustrates another example of a groove insert for the trim groove 70, referred to as groove inserts 84. The groove inserts 84 may comprise two components and fill a portion of a volume of the trim groove 70. For example, each of the groove inserts 84 may be located on either side of a trim line of a blank or vehicle component so that a gap between the groove inserts 84 is aligned with the trim line. Each of the groove inserts 84 may be of a material to operate as a reflector to minimize heat extraction from adjacent coolant channels to further assist in forming desired microstructures in soft strength zones. In one example, each of the groove inserts 84 may be of a ceramic material having radiation characteristics.

Figure 6:
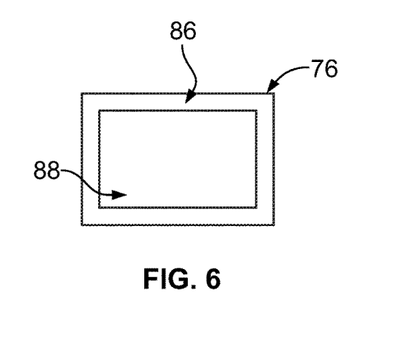
FIG. 6 is a detailed plan view of a portion of the die element of FIG. 5.
Figure 7:
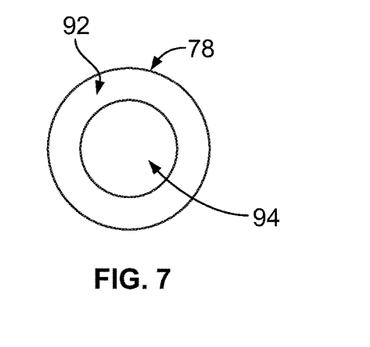
FIG. 7 is a detailed plan view of another portion of the die element of FIG. 5.

FIGS. 6 and 7 show further detail of the first cavity 76 and the second cavity 78. The first cavity 76 and the second cavity 78 may be arranged upon the first die element 24 adjacent a location of the blank or vehicle component requiring a piercing operation, such as an opening for a fastener. The first cavity 76 and the second cavity 78 assist in forming microstructures having soft strength zone characteristics. For example, a first contact portion 86 may extend about a first non-contact portion 88 defined by the first cavity 76. A second contact portion 92 may extend about a second non-contact portion 94 defined by the second cavity 78. The non-contact portions may correspond to a portion of a blank or vehicle component requiring a piercing operation to provide similar benefits to those achieved with the trim grooves from a heat extraction perspective. For example, the portions of the blank or vehicle component extending over the first non-contact portion 88 and the second non-contact portion 94 are subjected to less heat extraction from an adjacent coolant channel in comparison to another portion of the blank or vehicle component in direct contact with a die element surface.

Figure 8:
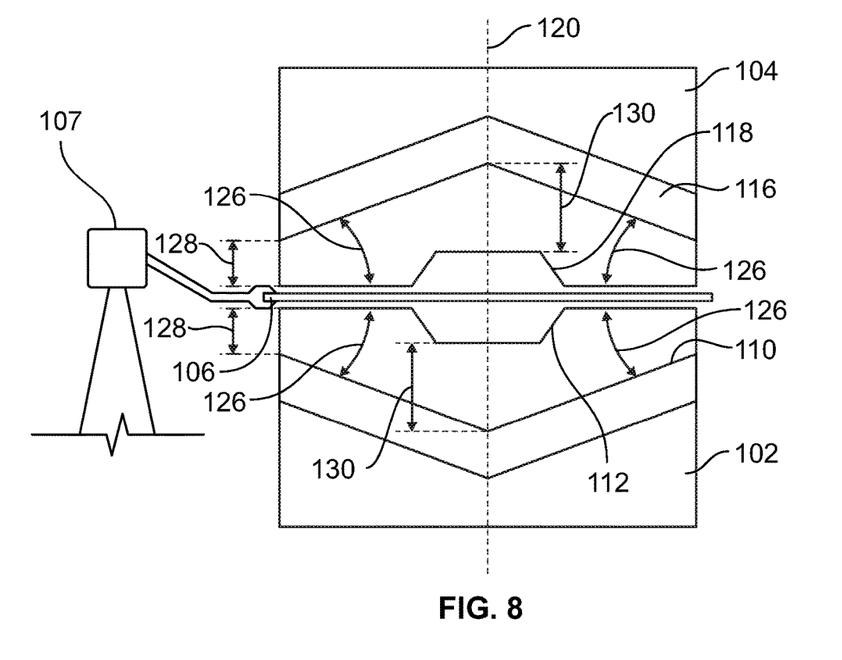
FIG. 8 is a schematic diagram, in cross-section, of an example of a portion of a die apparatus of the stamping process of FIG. 1.

FIG. 8 is a schematic diagram, in cross-section, of an example of a portion of a die apparatus for use with the stamping process described herein. The die apparatus includes a first die element 102 and a second die element 104 arranged with one another for disposal of a blank 106 therebetween. A fixture 107 may retain the blank 106 in a position so the blank 106 does not contact the first die element 102 and the second die element 104 after vehicle component formation. The first die element 102 and the second die element 104 may operate with one another to form the blank 106 into a vehicle component having variable microstructures and strength zones.

For example, the first die element 102 may include a first coolant channel 110 and a first trim groove 112. The second die element 104 may include a second coolant channel 116 and a second trim groove 118. Each of the first coolant channel 110 and the second coolant channel 116 form separate V shapes. Axis 120 intersects the blank 106 at a trim line 121 and intersects the coolant channels at an apex having maximum spacing from the blank 106. A spacing between surfaces of the trim grooves and portions of the blank adjacent the trim line 121 reduces heat extraction by coolant flowing through the coolant channels in comparison to portions of the blank 106 closer to or in contact with die element surfaces. This reduced amount of heat extraction provides a lower cooling rate for the blank 106 to form soft strength zones having a microstructure of one or both of pearlite and ferrite. These soft strength zones of the blank 106 located adjacent the trim line 121 provide regions where trimming and piercing operations are less stressful on trimming and piercing tools in comparison to trimming and piercing operations of regions having a hard strength zone. It is contemplated that the first coolant channel 110 and the first trim groove 112 may be formed as an insert component for mounting within a cavity defined by the first die element 102 such that various insert components having various channel and groove sizes may be mounted to the first die element 102.

Each of the first coolant channel 110 and the second coolant channel 116 are oriented at an angle 126 relative to a surface of one of the die elements. In one example, the coolant channels are oriented at an angle of between twenty and forty degrees relative to the respective surface of one of the die elements. The orientation of the coolant channels provides for a first length 128 between the coolant channels and a die element surface and a second length 130 between the coolant channels and a die element surface. The second length 130 is greater than the first length 128 so that a cooling rate of the blank 106 will be higher the closer the coolant channel is to the blank 106.

The higher cooling rate will assist in forming microstructures of the blank 106 having higher strength zones in comparison to portions of the blank 106 subjected to a lower cooling rate. Each of the coolant channels may be gun-drilled. Use of gun-drilled coolant channels oriented at an angle relative to die element surfaces is also simpler than designing complex coolant channels variably spaced from or conforming to vehicle component shapes.

Figure 9:
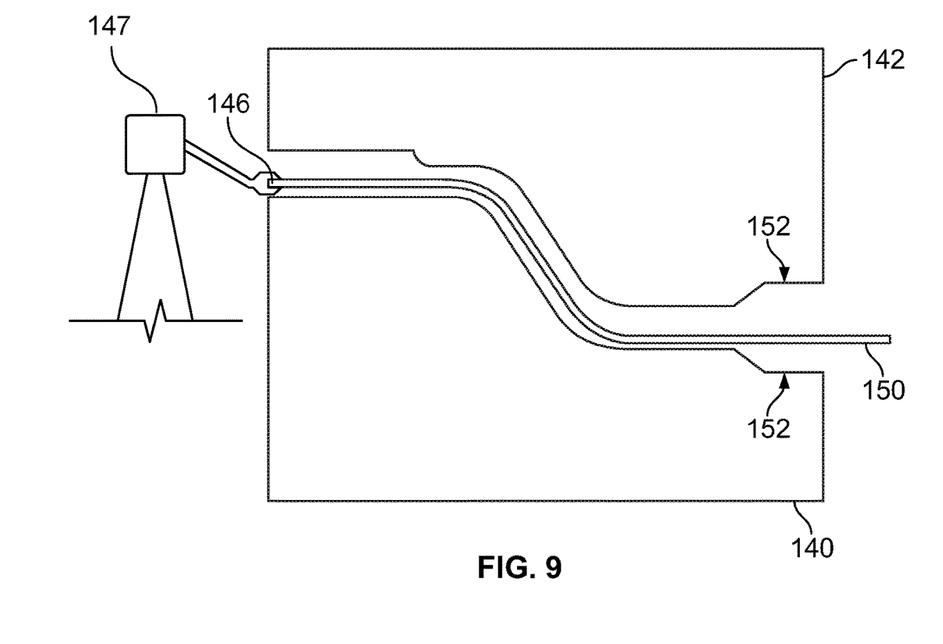
FIG. 9 is a schematic diagram, in cross-section, of an example of a portion of a die apparatus of the stamping process of FIG. 1.

FIG. 9 is a schematic diagram, in cross-section, of another example of a die apparatus for use with the stamping process described herein. The die apparatus includes a first die element 140 and a second die element 142 arranged with one another for disposal of a blank 146 therebetween. Each of the first die element 140 and the second die element 142 may include coolant channels (not shown in FIG. 9) spaced from respective die element surfaces located adjacent the blank 146. A fixture 147 may hold the blank 146 between the first die element 140 and the second die element 142.

In this example, the blank 146 is arranged with the die elements so that a portion of the blank 146 includes a trim line 150 located outside of a mouth 152 defined by the die elements. The portion of the blank 146 located outside of the mouth 152 will be air-cooled at a rate less than a cooling rate of portions of the blank 146 located closer to the coolant channels. Portions of the blank 146 located adjacent the trim line 150 will cool at a rate to reduce a cooling rate of the blank 146 to prevent martensitic transformation and to form microstructures of one or both of pearlite and ferrite and create soft strength zones adjacent the trim line 150. The soft strength zones provide for less stress on trimming tools in comparison to trimming operations of hard strength zone portions.

Figure 10:
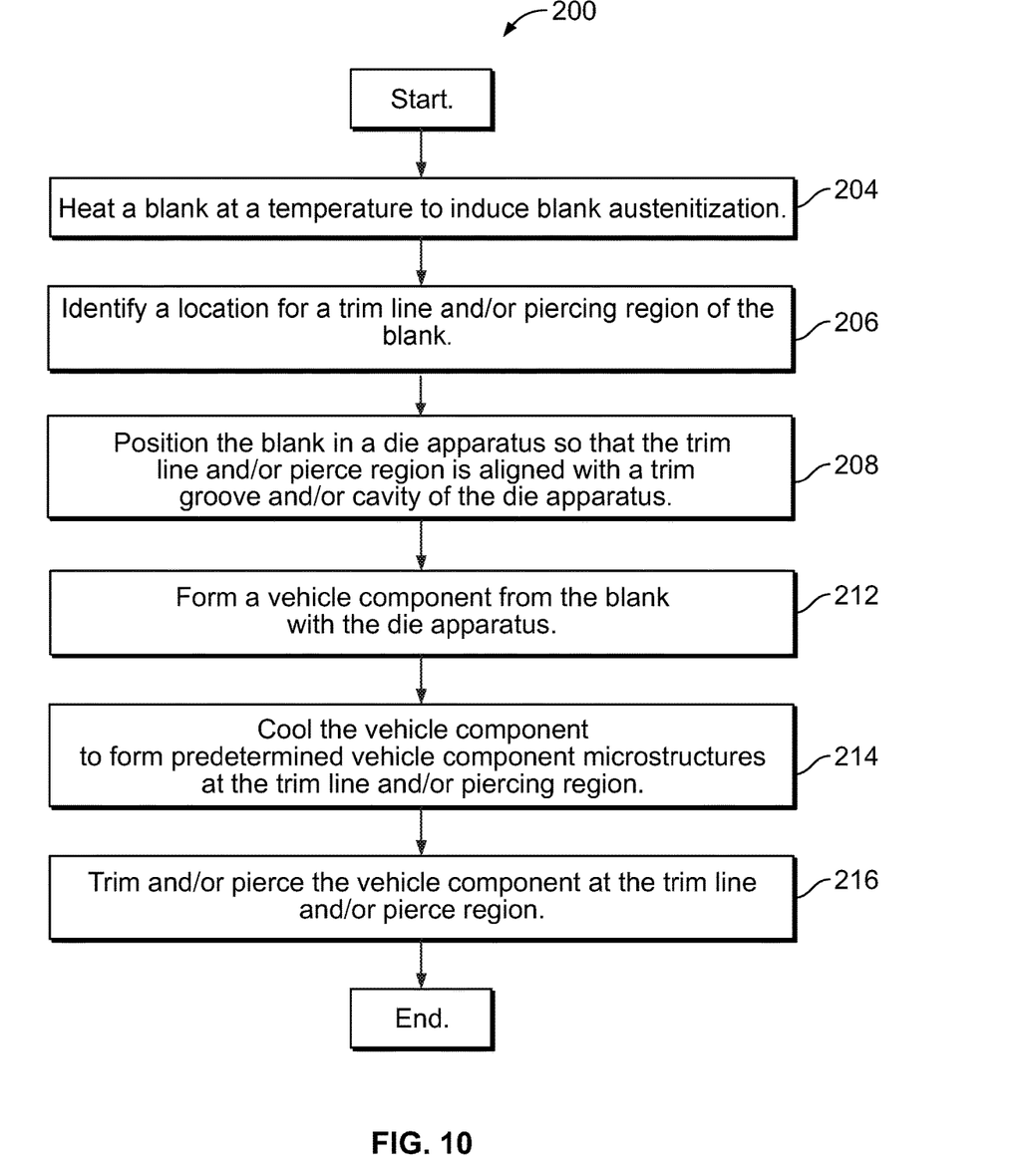
FIG. 10 is a flow chart illustrating an example of a method for forming multiple strength zones of a vehicle component.

FIG. 10 is a flow chart illustrating an example of a method for forming multiple strength zones of a vehicle component using the stamping process described herein, referred to as a method 200. In operation 204, a blank is heated at a temperature to induce blank austenitization. The temperature output to induce austenitization is determined based on a material of the blank and on a thickness of the blank.

In operation 206, a location for a trim line and/or a piercing region of a blank is identified.

In operation 208, the blank is positioned within a die apparatus so that the trim line and/or pierce region is aligned with a trim groove and/or cavity of the die apparatus. Alternatively, the blank may be positioned within the die apparatus so that the trim line and/or pierce region are on a portion of the blank located outside of the die apparatus. The trim groove and the cavity may be similar to embodiments described herein.

In operation 212, the die apparatus forms the blank into a vehicle component.

In operation 214, the vehicle component is cooled to form predetermined microstructures via coolant flowing through the coolant channels or via the die apparatus. The coolant channels are variably spaced from the vehicle component to form predetermined microstructures of the vehicle component at, for example, the trim line and/or pierce region. The coolant channels may be spaced from the vehicle component to form soft strength zones having microstructures including one or both of pearlite and ferrite. Due to formation of the soft strength zones at the trim line and pierce region, traditional trim and pierce tools may be used instead of a laser trimming apparatus. Using these traditional trim and pierce tools provides for a reduced cycle time in comparison to use of a separate laser trimming apparatus and a reduced cost for the tools.

In operation 216, the trim and/or pierce tool trims the vehicle component at the trim line and/or pierces the vehicle component at the pierce region.

While various embodiments are described above, it is not intended that these embodiments describe all possible forms encompassed by the claims. The words used in the specification are words of description rather than limitation, and it is understood that various changes can be made without departing from the spirit and scope of the disclosure. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A die apparatus comprising:
   a first die element arranged with a second die element for disposal of a blank therebetween and including a coolant channel and a trim groove for alignment with a trim line of the blank; and
   a groove insert disposed within the trim groove arranged to support a portion of the blank extending thereover and to reduce a cooling rate of the blank.

2. The apparatus of claim 1, wherein the groove insert is of a material including reflective radiation characteristics to reduce heat transfer from portions of the blank adjacent the trim line.

3. The apparatus of claim 1, wherein the first die element includes a cavity aligned with a pierce region of the blank so that the pierce region does not contact an adjacent die element surface.

4. The apparatus of claim 1, wherein a first portion of the coolant channel is spaced approximately six millimeters from a die element surface and a second portion of the coolant channel is spaced more than six millimeters from the die element surface.

5. The apparatus of claim 1, wherein the coolant channel is shaped to conform to a surface of one of the first die element and the second die element and the trim groove.

6. The apparatus of claim 1, wherein the coolant channel is gun drilled and forms a V shape, and wherein an apex of the V shape is spaced more than six millimeters from a respective die surface.

7. The apparatus of claim 1, wherein the trim groove has a depth between approximately 0.5 millimeters and 4.0 millimeters relative to a surface of the first die element.

8. The apparatus of claim 1, wherein the groove insert comprises two components sized to partially fill a volume of the trim groove and spaced from one another such that a gap therebetween is aligned with the trim line.

9. The apparatus of claim 1, wherein the groove insert is a single component sized to substantially fill a volume of the trim groove.

10. The apparatus of claim 1, wherein the blank is arranged with the first die element and the second die element so that another trim line is located outside of the die elements to avoid die cooling to reduce a cooling rate of the blank to prevent martensitic transformation.

11. A method of forming vehicle components comprising:
    heating a blank to induce blank austenitization;
    positioning the blank between two die elements so a trim line portion of the blank aligns with a trim groove of one of the two die elements;
    forming a vehicle component from the blank;

identifying a pierce region of the vehicle component;

aligning a cavity of one of the two die elements with a pierce region of the vehicle component to minimize heat transfer between the two die elements and the pierce region to form a soft strength zone at the pierce region;

applying a coating upon a surface of the cavity or trim groove; and cooling the blank via heat transfer to the two die elements, wherein the trim line is arranged with the trim groove to minimize heat transfer between the two die elements and portions of the vehicle component adjacent the trim line to form additional soft strength zones, wherein portions of the vehicle component other than the trim line are arranged between the two die elements for cooling at a rate sufficient for martensitic transformation, and wherein the coating has high radiation reflectivity characteristics to further reduce heat transfer between the two die elements and the pierce region.

12. The method of claim 11 further comprising positioning a groove insert in the trim groove to support a portion of the blank extending thereover.

13. A die apparatus comprising:

first and second die elements spaced from one another to receive a blank therebetween and at least one of the first and second die elements including a trim groove for aligning with a trim line of the blank, a coolant channel spaced from the trim groove, and a die element surface, wherein the trim groove has a depth equal to two times a thickness of the blank and a width equal to ten to fifteen times the thickness of the blank so that the first and second die element cool regions of the blank adjacent the trim line at a rate slower than a critical cooling rate to prevent martensitic transformation.

14. The apparatus of claim 13, wherein the at least one of the first and second die elements further defines a cavity for alignment with a pierce region of the blank so that the pierce region does not contact an adjacent surface of the first and second die elements.

15. The apparatus of claim 13, wherein the trim groove has a depth between approximately 0.5 millimeters and 4.0 millimeters relative to a surface of one of the first and second die elements and a width between approximately ten millimeters and thirty millimeters.

16. The apparatus of claim 13 further comprising one of a groove insert for disposal within the trim groove or a coating applied to or formed upon a surface of the trim groove, wherein the groove insert and the coating each are of a material having reflector characteristics to reduce thermal heat transfer between portions of the blank adjacent the trim line and one of the first and second die elements.

17. The apparatus of claim 16, wherein the groove insert is sized to substantially fill a volume of the trim groove.

18. The apparatus of claim 16, wherein the groove insert comprises first and second components spaced from one another so that a gap between the first and second components is aligned with the trim line of the blank.

* * * * *